US010308509B2

(12) United States Patent
Ramoino et al.

(10) Patent No.: US 10,308,509 B2
(45) Date of Patent: Jun. 4, 2019

(54) OZONE GENERATOR

(71) Applicant: DEGREMONT TECHNOLOGIES AG, Dubendorf (CH)

(72) Inventors: Luca Ramoino, Thalwil (CH); Sieghard Seyrling, Zurich (CH); Marco Muller, Unterengstringen (CH)

(73) Assignee: DEGREMONT TECHNOLOGIES AG, Dubendorf (CH)

( * ) Notice: Subject to any disclaimer, the term of this patent is extended or adjusted under 35 U.S.C. 154(b) by 0 days.

(21) Appl. No.: 15/026,476

(22) PCT Filed: Oct. 3, 2014

(86) PCT No.: PCT/EP2014/071248
§ 371 (c)(1),
(2) Date: Mar. 31, 2016

(87) PCT Pub. No.: WO2015/049376
PCT Pub. Date: Apr. 9, 2015

(65) Prior Publication Data
US 2016/0251220 A1    Sep. 1, 2016

(30) Foreign Application Priority Data

Oct. 4, 2013  (FR) ..................................... 13 59658

(51) Int. Cl.
*C01B 13/11* (2006.01)
(52) U.S. Cl.
CPC ............ *C01B 13/115* (2013.01); *C01B 13/11* (2013.01); *C01B 2201/22* (2013.01); *C01B 2201/32* (2013.01); *C01B 2201/76* (2013.01)
(58) Field of Classification Search
None
See application file for complete search history.

(56) References Cited

U.S. PATENT DOCUMENTS

| 4,886,645 A | 12/1989 | Fischer et al. |
| 5,145,653 A | 9/1992 | Fischer et al. |

(Continued)

FOREIGN PATENT DOCUMENTS

| DE | 32 20 018 A1 | 1/1983 |
| JP | 53-096988 | * 8/1978 |

(Continued)

OTHER PUBLICATIONS

Database WPI Section Ch, Week 197839 Thomson Scientific, London, GB; Class E31, AN 1978-69723A XP002733165, "Ozoniser with increased efficiency—in which discharge density at ozone drain side electrodes is lower than at gas feed side electrodes".

(Continued)

*Primary Examiner* — Kishor Mayekar
(74) *Attorney, Agent, or Firm* — Young & Thompson

(57) ABSTRACT

A continuous ozone generator includes: at least two electrodes with a dielectric medium placed therebetween, the electrodes defining discharge gaps; an input end for circulating an oxygen-loaded gas to an output end; at least one electrode being made up of at least two segments, placed one behind the other in the direction of the flow of the gas; elements for cooling the electrodes, and elements for supplying electrical current to establish voltage between the electrodes and cause discharges within the gaps where the gas flows. The segments of the electrode are divided into at least two electrically separate groups, and the electrical current supply elements include at least two separate electrical supply stages, respectively corresponding to each segment group, thus ensuring that power is provided by each stage while taking into consideration the local ozone concentration, while power supply optimization elements are provided to, respectively, control each electrical supply stage.

12 Claims, 2 Drawing Sheets

(56) References Cited

U.S. PATENT DOCUMENTS

2008/0193343 A1 8/2008 Vezzu
2008/0260603 A1 10/2008 Lang et al.

FOREIGN PATENT DOCUMENTS

| JP | S53-96988 A | 8/1978 |
| JP | S55-20240 A | 2/1980 |
| WO | 2006/051173 A1 | 5/2006 |
| WO | 2007/014474 A1 | 2/2007 |

OTHER PUBLICATIONS

International Search Report, dated Jan. 15, 2015, from corresponding PCT Application.

* cited by examiner

OZONE GENERATOR

BACKGROUND OF THE INVENTION

Field of the Invention

The invention relates to a continuous ozone generator, of the type of those which comprise:
- at least two electrodes, with a dielectric positioned between the electrodes, which define, between them, discharge gaps,
- an inlet end for circulation, in the gaps, of a gas charged with oxygen up to an outlet end,
- at least one electrode being composed of at least two segments, positioned one behind the other in the direction of flow of the gas,
- means for cooling the generator,
- and means for supplying with electric current, in order to establish a voltage between the electrodes and to bring about discharges in the gaps where the gas is circulating.

Description of the Related Art

Such a generator produces ozone by silent discharge, known as DBD (Dielectric Barrier Discharge). Generators of this type are known, in particular from WO 2006/051173 and WO 2007/014474. The electric field applied between the electrodes generates discharges in the oxygen-comprising gas which is flowing between the electrodes. A cold plasma is initiated in the gaps. The plasma discharges result in a dissociation of the oxygen molecules and in the formation of ozone. The energy for initiating and maintaining the plasma is provided by an electrical supply unit connected to the electrodes.

In many generators, the electrodes and the dielectric are positioned according to a tubular structure and the gas flows through the annular gaps inside one or more tubes.

JP 53-96988 shows a continuous ozone generator, of the type in question, in which the segments of the electrode are divided into at least two electrically separated groups, one of the groups being closer to the gas inlet and the other group being closer to the outlet, and the means for supplying with electric current comprise at least two separate electrical supply stages respectively associated with each group of segments.

Independently of the specific geometry used for the electrodes, the gas flows through the gaps according to a continuous flow and the generator is designed in order for the residence time of the gas to be sufficient to obtain, at the outlet, the desired ozone concentration, which implies a sufficient length of the course of the gas between the inlet and the outlet.

The production of ozone consumes energy and one of the aims of the invention is to reduce this energy consumption by increasing the efficiency of the generator in order to produce more ozone with one and the same amount of energy or to reduce energy consumption for a predetermined amount of ozone.

Ozone, both in nature and in a generator, has a tendency to recombine and to decay to give molecular oxygen. The decay can be accelerated by the discharges present in a generator. This decay depends on the concentration of ozone and increases when the concentration of ozone increases. The result of this is that there exists, for an ozone generator of given type, a concentration of ozone for which the production and the destruction of ozone become equal.

Thus, there corresponds, to an ozone generator, a maximum ozone concentration which can be obtained with this generator. It is thus of great advantage industrially to develop generators capable of operating at high concentrations of ozone.

The operating point of an ozone generator is normally a compromise between:
1/ the energy output, for which it is advisable to operate at a low concentration of ozone, and
2/ the cost of the feed gas and the total cost, for which it is preferable to reduce the volumes of feed gas and thus to increase the concentration of ozone. Another factor influencing the total cost is the size of the ozone generator. An improvement in the energy efficiency makes it possible, for a predetermined production capacity, to reduce the size of the generator.

BRIEF SUMMARY OF THE INVENTION

It is an aim of the invention in particular to offer a good compromise combining a high energy efficiency and a high concentration of ozone.

The invention provides optimization of the efficiency of the ozone generator by acting on the way the energy is supplied to the system.

According to the invention, an ozone generator of the type defined above is characterized in that it comprises means for optimizing the furnishing of energy which are provided in order to respectively control each electrical supply stage and in order to make use of the different local concentrations of ozone by being capable of acting on the power and/or the voltage and/or the current and/or the frequency and/or the waveform of the supply and/or, in the case of a pulsed supply, on the cyclic ratio.

Advantageously, each supply stage is composed of an independent source of electrical energy.

The electrode, which is composed of at least two groups of segments, can be produced in two parts of the same size, the two groups of the electrode comprising the same number of segments, and the generator comprises an independent source of electrical energy for each group.

Preferably, for a total power P1+P2 provided by the two energy sources associated with the two groups of segments, the power P2 provided by the second source associated with the higher concentration of ozone is greater than that P1 of the other source when the production levels are relatively low, whereas, for higher production levels, the power P1 provided by the source associated with the lower concentration of ozone becomes greater than half of the total power provided.

For other embodiments, the relationship between the powers P1 and P2 can be different.

The generator can comprise a container, closed at its ends, comprising parallel tubes constituting an external electrode, while an internal electrode is positioned in each tube, at least one of the electrodes being composed of a plurality of tubular segments, positioned one behind the other, along the direction of flow of the gas.

Advantageously, the tubular segments are divided into two groups electrically separated by an insulating break, the different sets of groups 1.1a, . . . 1.na, on the one hand, and 1.1b, . . . 1.nb, on the other hand, being electrically connected in parallel in order to form two groups 1a, 1b, the means for supplying with electric current comprising two separate electrical supply sources.

Each internal electrode can comprise four tubular segments, divided into two electrically separated groups.

Of course, the number of segments of an electrode can be different from four.

The invention applies to any ozone generator in which the route of the gas between the inlet and the outlet exhibits a significant length. This is true for all ozone generators which operate continuously. In such a generator, the chemical composition of the gas changes as the gas progresses through the generator, the concentration of ozone increasing from the inlet toward the outlet.

The invention makes it possible to choose, for each supply stage, optimal parameters for the production of ozone as a function of the concentration of ozone. The use of two or more independent sources of electrical supply makes it possible to independently monitor the way in which the energy is supplied to the different sections of the generator which are located between the inlet and the outlet, taking into account the mean concentration of ozone in the section under consideration. In each successive section, the mean concentration of ozone increases with respect to that of the preceding section and the way the electrical energy of which is supplied to this section is accordingly optimized.

The ideal combination for furnishing energy to the different sections of the generator generally depends on the operating point of the generator, that is to say on the concentration of ozone at the outlet, and on the production throughput. With independent sources of supply or with independently controlled supply stages, it is possible to optimize the way in which the energy is provided for a given operating point. The efficiency of the generator can be adjusted and optimized to any operating condition.

The furnishing of energy to the system can be optimized by acting on the power, the voltage, the current, the frequency, the waveform and, in the case of a pulsed supply, on the cyclic ratio or operating cycle. These parameters are not necessarily independent of one another but each produces a specific effect on the process for the production of ozone. It can be advantageous to adjust each of these parameters to the local ozone concentration but, for practical reasons, it is simpler to consider one of these parameters or the combination of a few of these parameters. The most suitable choice depends on the particulars of the ozone generator and in particular on its electrical supply. However, in the majority of cases, each section of the generator will operate with a different energy density and/or a different frequency and/or a different voltage and/or a different waveform and/or a different cyclic ratio. The generator can thus operate efficiently and the production of ozone for a given concentration can be increased.

The invention consists, apart from the provisions set out above, of a certain number of other provisions which will be more explicitly mentioned below on the subject of implementational examples, described with reference to the appended drawings but which are in no way limiting. In these drawings:

DETAILED DESCRIPTION OF THE PREFERRED EMBODIMENTS

Figure 1:
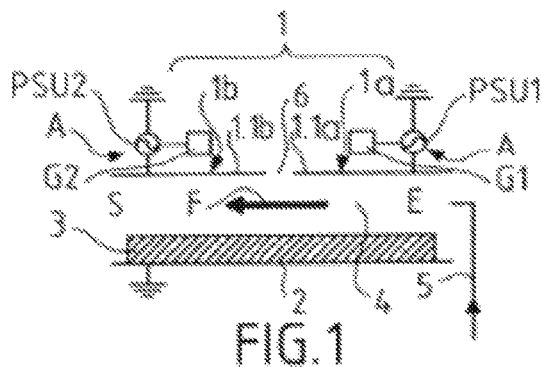
FIGS. 1-4 are simplified diagrams of an ozone generator according to the invention.

On referring to FIG. 1 of the drawings, there may be seen a diagrammatic representation of an ozone generator according to the invention comprising two electrodes 1, 2 represented in the form of plates with a dielectric or dielectric barrier 3 positioned between the electrodes, which define between them discharge gaps 4. According to the example of FIG. 1, the dielectric barrier 3 is applied against the face of the electrode 2 turned toward the electrode 1.

A gas charged with oxygen, in particular air, originating from a pipe 5 flows in the gaps 4 from an inlet end E to an outlet end S.

Figure 3:
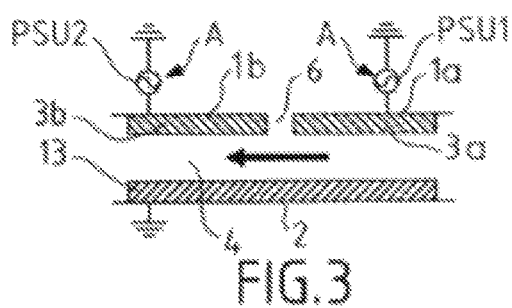
Figure 4:
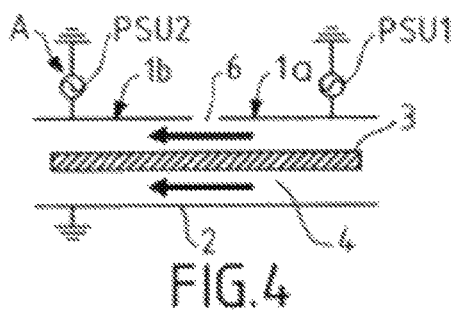
Figure 5:
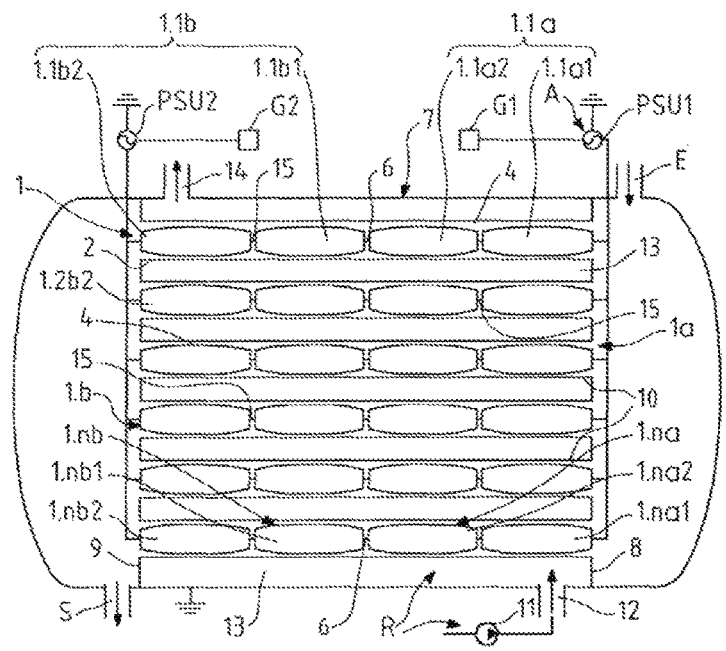
FIG. 5 is an axial vertical section of an ozone generator having tubular electrodes according to the invention.

Means for cooling R the electrodes, not represented in FIGS. 1-4 but illustrated in FIG. 5, are provided, and also means A for supplying with electric current, in particular with alternating current, in order to establish a voltage between the electrodes 1, 2 and to bring about discharges in the gaps 4 where the gas is circulating.

At least the electrode 1 is composed of at least two segments 1.1a, 1.1b positioned behind one another in the direction of flow of the gas represented by an arrow F. The length of the course of the gas between the electrodes 1 and 2 is sufficient to obtain, at the outlet, the desired concentration of ozone and this concentration changes between the inlet E and the outlet S.

According to the invention, the segments 1.1a, 1.1b of the electrode 1 are divided into at least two groups 1a, 1b which are electrically separated, one of the groups 1a being closer to the gas inlet E and the other group 1b being closer to the outlet S.

According to the diagram of FIG. 1, each group 1a, 1b comprises just one segment 1.1a, 1.1b. However, each group might be composed of several segments electrically connected to one another. The electrical separation of the two groups 1a, 1b is represented diagrammatically by an electrically insulating break 6.

The means A for supplying with electric current comprise at least two separate electrical supply stages respectively associated with each group 1a, 1b of segments. The furnishing of energy provided by each stage is adjusted to the concentration of ozone at the group under consideration 1a, 1b.

According to the example represented, the electrical supply stages of each group 1a, 1b are composed of two independent separate electrical supply sources, PSU1 and PSU2, respectively associated with a group 1a, 1b. The electrode 2 is connected to earth, as is one of the terminals of the sources PSU1 and PSU2, the other terminal of these sources being connected to the associated group 1a, 1b of the electrode 1.

The furnishing of energy provided by each source PSU1 and PSU2 is optimized as a function of the concentration of ozone at the associated group 1a, 1b. Each energy source can be optimized by acting on the energy density and/or the frequency and/or the voltage and/or the waveform and/or the cyclic ratio of the current signals provided, which makes it possible to improve the output of the ozone generator.

Means G1, G2 for optimizing the furnishing of energy are provided in order to control each energy source. The concentration of ozone can be measured at the outlet S of the generator. In the general case, G1 and G2 constitute a system for controlling the power and/or the voltage and/or the current and/or the frequency and/or the waveform of the supply and/or, in the case of a pulsed supply, for acting on the cyclic ratio of each of the energy sources.

In an alternative form, the optimization system formed by G1 and G2 might be provided in order to take into account the concentration of ozone and to ensure a variation in the power and/or in the voltage and/or in the current and/or in the frequency and/or in the waveform of the supply and/or, in the case of a pulsed supply, in order to act on the cyclic ratio of each of the energy sources. The system thus makes use of the different local concentrations, independently of the fact that the concentration of ozone is or is not measured.

Figure 2:
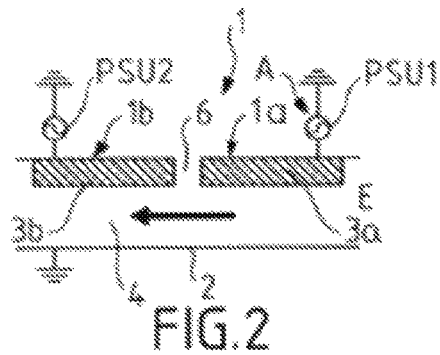

FIG. 2 is another diagram illustrating a generator according to the invention in which the dielectric is separated into two barriers $3a$, $3b$ applied against the groups $1a$, $1b$ of the electrode 1. The other elements, identical or similar to elements already described with regard to FIG. 1, are designated by the same references without their description being repeated.

According to an alternative form, not represented, each of the two electrodes can be composed of at least two separate segments.

According to the diagram of FIG. 3, a dielectric barrier 3 is provided against the electrode 2, and also dielectric barriers $3a$, $3b$ are provided against the groups $1a$, $1b$ of the electrode 1.

According to the diagram of FIG. 4, the dielectric barrier 3 is provided between the electrodes.

FIG. 5 illustrates an ozone generator according to the invention comprising a container 7, which can have a cylindrical or prismatic or other general shape, with a horizontal axis, closed at its ends. The container 7 comprises, in the vicinity of each of its longitudinal ends, a wall 8, 9 orthogonal to the geometric axis of the container. Each wall comprises holes facing those of the other wall. Into these holes are inserted tubes 10 extending from one wall 8 to the other wall 9 and respectively welded to these walls. The tubes 10 can be of several types, in particular metal tubes, glass tubes or ceramic tubes with an internal metal coating. The tubes 10 constitute external electrodes connected, with the container 7, to the potential of the earth. It can be considered that the set of the tubes 10, electrically connected to one another, form a single external electrode equivalent to the electrode 2 of FIGS. 1-4. The length of the tubes 10 is sufficient, in particular of the order of 2 meters, or more, for the concentration of ozone in the gas at the outlet S to be markedly greater than that of the gas which arrives via the inlet E.

The cooling means R comprise a circulation pump 11 which introduces, via an inlet 12, cooling water into a space 13 surrounding the tubes 10. The liquid coolant, namely the water, is discharged via an outlet 14.

An internal electrode is positioned in each tube 10. Each internal electrode is composed of a plurality of tubular segments, in particular metal segments, designated by $1.1a1$, $1.1a2$, $1.1b1$, $1.1b2$ for the first electrode. The segments are closed at each end and provided externally with a dielectric barrier, in particular with a ceramic coating. The tubular segments such as $1.1a1 \ldots 1.1b2$ are positioned one behind the other, along the direction of flow of the gas, in alignment.

In the example considered, each internal electrode is composed of four segments but the number of segments might be different.

The segments of each internal electrode are divided into two groups $1.1a$ and $1.1b$, both composed, in the example considered, of two segments electrically connected by a connection 15 between their adjacent ends. The two groups $1.1a$, $1.1b$ are electrically separated by the electrically insulating break 6 between the facing ends of the neighboring segments of each group. The group $1.1a$ is the closest to the inlet E for the gas, while the group $1.1b$ is the closest to the outlet S.

Means (not represented) for maintaining the tubular segments with respect to the external electrode are provided for the formation of the annular discharge gaps 4 between the external surface of the segments and the internal surface of the external electrode.

The different sets of groups $1.1a$, $1.2a$, ... $1.na$, on the one hand, and $1.1b$, $1.2b$ ... $1.nb$, on the other hand, are electrically connected in parallel so that these two sets of groups can be regarded as forming two groups $1a$, $1b$.

The group $1a$ is located in the first half of the external electrodes, the concentration of ozone in this part being lower than that present in the other group $1b$ located in the second part of the external electrode.

The means A for supplying with electric current comprise two separate sources of electrical supply PSU1 and PSU2. The source PSU1 comprises a terminal connected in parallel to the segments of the group $1a$, the other terminal of the source being connected to earth.

The supply source PSU2 comprises a terminal connected in parallel to the segments of the group $1b$ located toward the outlet and another terminal connected to earth.

Of course, the layout of the ozone generator is not limited to the example given with regard to FIG. 5. The number of groups of segments and the number of segments in each group can be different from two and the number of separate electrical supplies can also be different from two and can correspond in general to the number of groups.

In an alternative form, the two separate supply sources illustrated in FIG. 5 might be replaced with two independent supply stages of one and the same electrical source, it being possible for the parameters of each stage to be regulated independently of those of the other stage.

The way in which the energy is delivered to each group $1a$ and $1b$ is adjusted, with regard to the corresponding source PSU1 or PSU2, to the concentration of ozone in the gas of the group considered. The adjusting can consist of an action with regard to the power and/or the voltage and/or the current intensity and/or the frequency and/or the waveform and/or, in the case of a pulsed source, with regard to the cyclic ratio or operating cycle. The frequency of the current delivered by the sources can be of the order of 1.45 kHz. The frequency of the current generally lies in the range from 500 Hz to 50 kHz.

Means G1, G2 for optimization of the furnishing of energy, similar to those described above, can additionally be provided.

The ozone generator can be characterized by its energy efficiency. A maximum efficiency at 100% is defined as that of an ideal system capable of producing 1.22 kg of ozone ($O_3$) for each kWh of energy provided, for a given level of production and for a predetermined concentration of ozone. The power P1 supplied by the source PSU1 and the power P2 supplied by the other source can be monitored independently. One and the same total power P1+P2 can thus be obtained by using different combinations of values for the powers P1, P2 supplied by the sources PSU1 and PSU2.

Tests have been carried out in which the generator of the invention according to FIG. 5 was compared with a conventional ozone generator having virtually the same structure but all the internal segments of the electrode 1 of which were electrically connected, that is to say that the break 6 was replaced with an electrical connection, and all the internal segments of which were supplied by a single electrical source.

Figure 6:
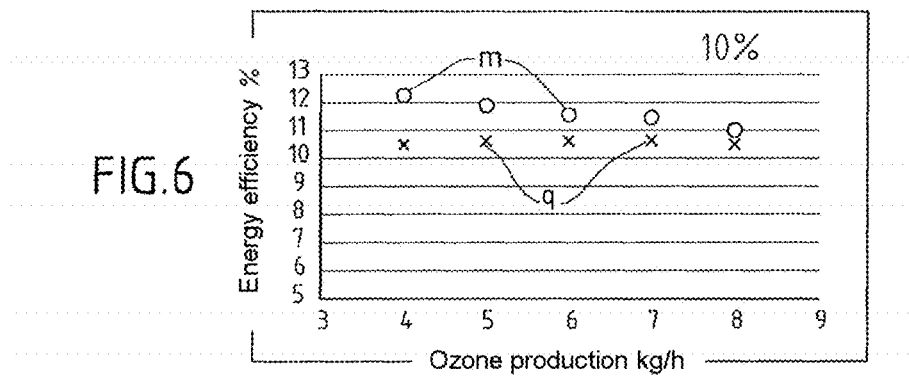
FIG. 6 is a graph illustrating the variation in the energy efficiency, carried on the ordinate, as percent, as a function of the ozone production, expressed in kg/h, carried on the abscissa, for a concentration of ozone at the outlet of 10% by weight.
Figure 7:
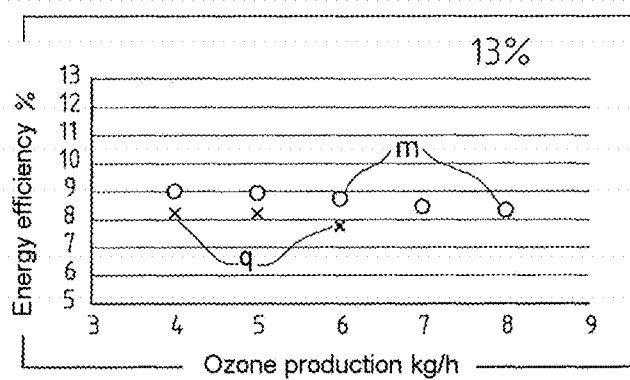
FIG. 7 is a similar graph to that of FIG. 6, in the case where the concentration of ozone at the outlet is 13% by weight.

With regard to the graphs of FIGS. 6 and 7, the point representative of the operation of the generator is determined by an abscissa corresponding to a throughput for the production of ozone, expressed in kilograms/hour (kg/h), and by an ordinate corresponding to the energy efficiency, expressed as percent of the maximum efficiency defined above.

The graphs of FIGS. 6 and 7 compare the energy efficiency of a generator according to FIG. 5, the operating points of which are represented by small circles m, with a conventional generator, the operating points of which are illustrated by crosses q. FIG. 6 corresponds to the production of an exiting gas charged with 10% by weight of ozone, while FIG. 7 corresponds to the production of an exiting gas charged with 13% by weight of ozone.

The increase in efficiency according to the invention is clearly apparent on the graphs. The increase is higher for the lower production throughputs. According to FIG. 7, with a conventional generator, no point q is plotted above 6 kg/h as it is no longer possible to produce a gas charged with 13% by weight of ozone for production rates of 7 and 8 kg/h.

In the case of an ozone generator according to the invention, different combinations of furnishing energy by the sources PSU1 and PSU2 are possible but are not equivalent in terms of energy efficiency. For the evaluation of the generator according to the invention, the optimum configuration for supplying energy by the two sources PSU1 and PSU2 was adopted.

The results provided with regard to FIGS. 6 and 7 were obtained in the case of an ozone generator according to the invention separated into two parts of equal sizes, that is to say according to a 0.5:0.5 ratio. Tests were also carried out using different combinations of electrical separation in the active discharge region. In practice, the complete range of combinations was explored from 0.1-0.9 to 0.9-0.1 relating to the distribution of the segments. It is apparent that the benefit provided by the separation of electrodes into two groups with supplying by two separate sources depends only slightly on the ratio of division of the segments of the internal electrode. The 0.5:0.5 ratio was preferred for practical reasons.

Figure 8:
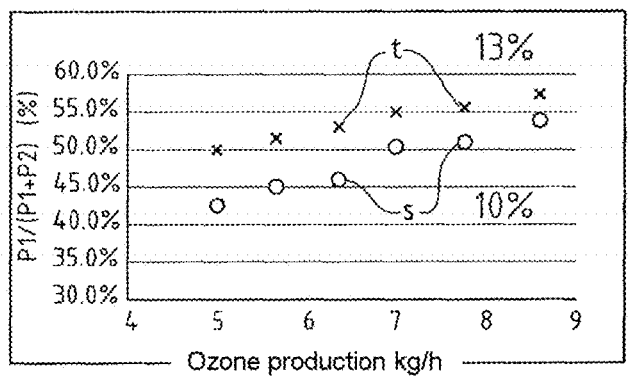
FIG. 8 is a diagram illustrating the distribution of the energy provided by two sources, expressed as percent and carried on the ordinate, as a function of the ozone production, expressed in kg/h, carried on the abscissa, in the case of ozone concentrations at 10% and 13% by weight.

In the case of an ozone generator separated into two parts of equal sizes, the graph of FIG. 8 gives the distribution in the furnishing of energy between the two sources in order to optimize the production. The production of ozone, expressed in kg/h, is shown on the abscissa. The ratio of the power P1 supplied by the source PSU1 to the total power P1+P2 supplied by the two sources is shown on the ordinate, as percent. The points represented by small circles s correspond to the production of gas charged with 10% by weight of ozone, while the points represented by crosses t correspond to the production of gas charged with 13% by weight of ozone.

In the case of gas charged with 10% of ozone, it is apparent that, for relatively low production levels, for example of approximately 5 kg/h of ozone, it is preferable to supply more power P2 by the second source PSU2, i.e. approximately 55% of the total power, whereas the power P1 is approximately 45% of the total power. The power supplied by each of the sources is essentially the same for a production of 7 kg/h, then, above, the power P1 of the source PSU1 becomes greater than half the total power supplied.

The invention can be applied to any system electrically separated into two or more groups, independently of their size. However, it is necessary for the separation of the groups to be applied along the direction of flow of the gas and for each section or group to correspond to a substantially different ozone ($O_3$) concentration.

An important point is to adjust the way in which the energy is supplied (in the present case, it is the energy per unit of active discharge surface area) to the mean local ozone concentration. Although, in the example considered, the generator has been divided into two parts, the solution of the invention can be applied in the same way to a system broken up into more than two parts.

The two sources PSU1 and PSU2 are regulated independently in order to provide dedicated furnishing of energy to each section. In the example considered, independent power regulation was used for the two sources PSU1 and PSU2 and consequently for the regulation of the intensity and of the voltage, which depend unambiguously on the power.

However, a similar optimization can be obtained by acting on other parameters, such as the frequency and the waveform of the alternating current applied to the electrodes, and by adjusting these parameters to the local concentration of ozone.

The invention can be applied to any ozone generator of the type defined at the start and in which the stream of oxygen-comprising gas flows through the generator, the concentration of ozone in the gas increasing as the gas progresses through the reactor or at different stages of the reactor.

The invention claimed is:
1. A continuous ozone generator, comprising:
a container (7) having closed ends, a cooling inlet (11), a cooling outlet (12), a gas inlet (E) and a gas outlet (S);
plural tubes (10) located within the container (7), the tubes (10) constituting an external electrode (2), each of the tubes (10) including an internal electrode (1) positioned therein;
a dielectric (3) positioned between the internal electrode (1) of each tube (10) and an inside surface of each tube (10),
wherein a space between the internal electrode (1) of each tube (10) and the inside surface of each tube (10) defines a discharge gap (4) for circulation of a gas charged with oxygen between the gas inlet (E) and the gas outlet (S),
wherein the internal electrode (1) of each tube (10) is comprised of at least a first tubular segment (1.1a1) and at least a second tubular segment (1.1b1) with the at least second tubular segment being positioned downstream of the at least first tubular segment in a direction of flow of the gas, each of the at least first tubular segment and each of the at least second tubular segment having closed ends;
an electrically insulating break (6) located within each tube (10) and separating each of the at least first tubular segment from each of the at least second tubular segment within each tube (10),
wherein each of the at least first tubular segment within each tube (10) are electrically connected in parallel with the at least first tubular segment within each other tube (10) to define a first group of first tubular segments (1a), and wherein each of the at least second tubular segment within each tube (10) are electrically connected in parallel with the at least second tubular segment within each other tube (10) to define a second group of second tubular segments (1b), the first group of first tubular segments being electrically separated from the second group of second tubular segments by the electrically insulating break (6) located within each tube (10), and the first group of first tubular segments (1a) being closer to the gas inlet (E) and the second group of second tubular segments (1b) being closer to the gas outlet (S);

a cooling system that supplies a coolant into the cooling inlet (11), into a space (13) surrounding the tubes, and out the cooling outlet (12), the cooling system for cooling the generator;

a first electric supply stage (PSU1) connected to the first group of first tubular segments for supplying a first electric current for i) establishing a first voltage in a first region of the discharge gaps between the first group of first tubular segments (1a) and the inside surface of each tube (10) adjacent the first group of first tubular segments, and ii) bringing about discharges in the discharge gaps where the gas is circulating in the first region of the discharge gaps, wherein the first electric supply stage is one of the group consisting of a pulsed electric supply and a non-pulsed electric supply;

a second electric supply stage (PSU2) connected to the second group of second tubular segments for supplying a second electric current for i) establishing a second voltage in a second region of the discharge gaps between the second group of second tubular segments (1b) and the inside surface of each tube (10) adjacent the second group of second tubular segments, and ii) bringing about discharges in the discharge gaps where the gas is circulating in the second region of the discharge gaps, wherein the second electric supply stage is one of the group consisting of the pulsed electric supply and the non-pulsed electric supply;

a first control system (G1) connected to the first electric supply stage (PSU1), the first control system (G1) configured, based on a determined local concentration of ozone in the first region of the discharge gaps, to act on at least one of the group consisting of power, voltage, current, frequency, waveform, and cyclic ratio of the first electrical supply stage (PSU1); and a second control system (G2) connected to the second electrical supply stage (PSU2), the second control system (G2) configured, based on a determined local concentration of ozone in the second region of the discharge gaps, to act on at least one of the group consisting of power, voltage, current, frequency, waveform, and cyclic ratio of the second electrical supply stage (PSU2), wherein the first control system (G1) and the second control system (G2) are configured to independently respectively control each of the first and second electrical supply stages (PSU1, PSU2), said independent respective control of each of the first and second electrical supply stages (PSU1, PSU2) depending on different values of the determined local concentrations of ozone in each of the first region of the discharge gaps and the second region of the discharge gaps to provide respectively a first power (P1) and a second power (P2), the first control system (G1) and the second control system (G2) each being further configured to provide a respective relative percentage of a total power (P1+P2) of the first and second power (P1, P2) based on a total production of ozone from the generator, the first control system (G1) being configured to control greater than 50% percentage of the total power (P1+P2) during a first total production amount of ozone and the second control system (G2) being configured to control greater than 50% percentage of the total power (P1+P2) during a second total production amount of ozone, thereby optimizing respective power provided by the first electrical supply stage (PSU1) and second electrical supply stage (PSU2).

2. The generator as claimed in claim 1, wherein the first electrical supply stage (PSU1) and the second electrical supply stage (PSU2) are separate power supplies.

3. The generator according to claim 2, wherein,
the first tubular segments and second tubular segments are each of a same size,
the first group of first tubular segments (1a) and second group of first tubular segments (1b) each comprise a same number of tubular segments, and
the first electrical supply stage (PSU1) and the second electrical supply stage (PSU2) are separate power supplies.

4. The generator as claimed in claim 2, wherein,
the internal electrode (1) of each tube (10) is comprised of plural of the first tubular segment (1.1a1, 1.1a2) and plural of the second tubular segment (1.1b1, 1.1b2) with the plural second tubular segments being positioned downstream of the plural first tubular segments in the direction of flow of the gas, each of the first tubular segments being end-connected and each of the second tubular segments being end-connected.

5. The generator according to claim 1, wherein,
the first tubular segments and second tubular segments are each of a same size,
the first group of first tubular segments (1a) and second group of first tubular segments (1b) each comprise a same number of tubular segments, and
the first electrical supply stage (PSU1) and the second electrical supply stage (PSU2) are separate power supplies.

6. The generator as claimed in claim 5, wherein the first control system (G1) and the second control system (G2) are configured to independently respectively control each of the first and second electrical supply stages (PSU1, PSU2) so that the second power (P2) provided by the second electrical supply stage (PSU2) associated with a higher concentration of ozone is greater than that the first power (P1) of the first electrical supply stage (PSU1) when production level is at a first production level, whereas, when the production level is at a second, higher production level, the first power (P1) provided by the first electrical supply stage (PSU1) associated with a lower concentration of ozone is greater than half of the total power (P1+P2) provided by the first electrical supply stage (PSU1) and the second electrical supply stage (PSU2).

7. The generator as claimed in claim 6, wherein, the internal electrode (1) of each tube (10) is comprised of plural of the first tubular segment (1.1a1, 1.1a2) and plural of the second tubular segment (1.1b1, 1.1b2) with the plural second tubular segments being positioned downstream of the plural first tubular segments in the direction of flow of the gas, each of the first tubular segments being end-connected and each of the second tubular segments being end-connected.

8. The generator as claimed in claim 5, wherein,
the internal electrode (1) of each tube (10) is comprised of plural of the first tubular segment (1.1a1, 1.1a2) and plural of the second tubular segment (1.1b1, 1.1b2) with the plural second tubular segments being positioned downstream of the plural first tubular segments in the direction of flow of the gas, each of the first tubular segments being end-connected and each of the second tubular segments being end-connected.

9. The generator as claimed in claim 8, wherein the internal electrode of each tube comprises four tubular segments, each tubular segment divided into two electrically separated groups.

10. The generator as claimed in claim 1, wherein the internal electrode (1) of each tube (10) is comprised of plural of the first tubular segment (1.1a1, 1.1a2) and plural of the second tubular segment (1.1b1, 1.1b2) with the plural second tubular segments being positioned downstream of the plural first tubular segments in the direction of flow of the gas, each of the first tubular segments being end-connected and each of the second tubular segments being end-connected.

11. The generator as claimed in claim 10, wherein the internal electrode of each tube comprises two of the first tubular segments (1.1a1, 1.1a2) and two of the second tubular segments (1.1b1, 1.1b2), the electrically insulating break (6) located within each tube (10) separating the two first tubular segments (1.1a1, 1.1a2) from the two second tubular segments (1.1b1, 1.1b2) within each tube (10).

12. The generator as claimed in claim 10, wherein the internal electrode of each tube comprises at least two of the first tubular segments (1.1a1, 1.1a2) and at least two of the second tubular segments (1.1b1, 1.1b2), the electrically insulating break (6) located within each tube (10) separating the first tubular segments (1.1a1, 1.1a2) from the second tubular segments (1.1b1, 1.1b2) within each tube (10).

* * * * *